May 3, 1927.
J. M. BROZ
1,626,594
CORN PLANTER WITH ONE-WHEEL SUPPORT
Filed July 24, 1926
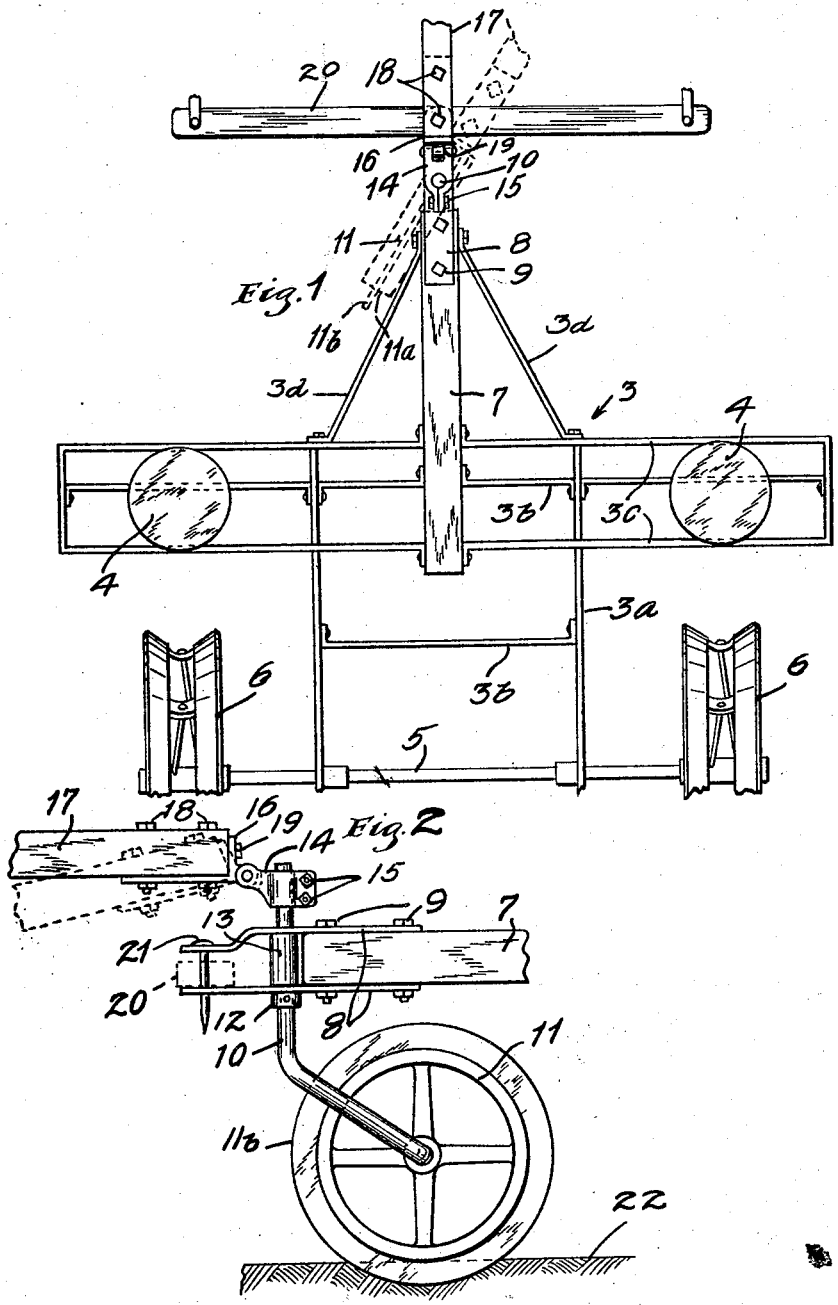
INVENTOR.
JAKE M. BROZ.
BY HIS ATTORNEYS.

Patented May 3, 1927.

1,626,594

UNITED STATES PATENT OFFICE.

JAKE M. BROZ, OF NEW EFFINGTON, SOUTH DAKOTA.

CORN PLANTER WITH ONE WHEEL SUPPORT.

Application filed July 24, 1926. Serial No. 124,715.

This invention relates to a corn planter or similar agricultural implement, and particularly to a corn planter of the two-wheeled type. As is well known to those skilled in the art, such corn planters are now made with a rigid frame supported on two axially alined wheels, which frame carries the grain holding receptacles and in the standard construction, has a tongue rigidly secured thereto and projecting forwardly therefrom at each side of which the horses are hitched. With such a construction the vibration of the frame caused by the unevenness of the ground is transmitted to the tongue and the tongue therefore jerks against the horses and harness. The horses always move somewhat from side to side and in so doing they transmit the lateral motion to the tongue which is in turn transmitted to the frame which is thus unnecessarily moved from side to side. It is not necessary for proper steering of the corn planter that the tongue be rigidly connected to the frame.

It is an object of this invention, therefore, to provide a two-wheeled corn planter or similar implement having a rigid frame and a supporting member at the front end thereof movable about a vertical axis and having a supporting wheel at its lower end, the tongue being horizontally pivoted in said member.

It is a further object of the invention to provide a two-wheeled corn planter having a rigid frame with a member projecting forwardly and centrally therefrom, together with means extending through said member and journaled therein about a vertical axis, having a flanged supporting wheel at its lower end and to which the tongue is pivotally connected about a horizontal axis.

It is still another object of the invention to provide a two-wheeled corn planter having a rigid frame with a member projecting forwardly and centrally therefrom, together with a rod extending through said member and journaled therein about a vertical axis, which rod extends downwardly from said member and is bent into horizontal position at its lower end to form the axle of a supporting wheel having a comparatively wide tread and a flange at the center thereof, said rod having a coupling clamped thereto above said member to which the tongue is pivotally connected about a horizontal axis, said member also preferably having a double tree pivotally connected thereto at its forward end.

These and other objects and advantages of the invention will be fully set forth in the following description made in connection with the accompanying drawings, in which like reference characters refer to similar parts throughout the several views and in which:—

Fig. 1 is a partial plan view of a corn planter showing the present invention embodied therein, some of the parts being shown in a different position in dotted lines; and Fig. 2 is a view in side elevation of the front portion of the corn planter, certain parts being indicated in a different position in dotted lines.

Referring to the drawings, a two-wheeled corn planter of standard construction as regards the parts otherwise than the tongue is illustrated somewhat diagrammatically of which it will only be necessary to consider the frame portion 3, comprising the longitudinally extending spaced bars 3$^a$ rigidly connected by transversely extending bars 3$^b$, the transversely extending members 3$^c$ which extend beyond the members 3$^a$ and form a rigid rectangular frame and on which frame are supported in spaced relation the grain carrying receptacles 4. The axle 5 is carried on the frame 3 and has the wheels 6 at the ends thereof. The frame 3 has a member 7 rigidly secured thereto at its central portion projecting forwardly therefrom. While this member may be of any desired character, in the embodiment of the invention illustrated it is shown as made of wood and as having the members 3$^b$ and 3$^c$ bolted or riveted thereto. Brace rods 3$^d$ are also shown extending from the forward member 3$^c$ forwardly in converging relation and bolted to each side of the member 7. In the standard construction the member 7 is usually continued forwardly to form the tongue of the corn planter or the tongue is rigidly connected to the member 7 and extends forwardly in alinement therewith. In accordance with the present invention the member 7 has plates 8 secured thereto at its top and bottom surface and held rigidly in position by the headed and nutted bolts 9 passing therethrough and through the member 7. The plates 8 project forwardly beyond the end of member 7 and are provided with alined holes adapted to receive a cylindrical rod or bar 10 which extends therethrough and is journaled therein. The bar 10 extends downwardly below the member 7 a short distance and is then bent to extend downwardly and rearwardly in an inclined direction, the lower end of said bar being then bent horizontally to form the axle for a wheel 11 forming a support for the front end of the planter and the member 7. The wheel 11 preferably has a wide tread 11ª and a flange 11ᵇ at the center thereof. The rod 10 has a collar 12 pinned thereto below the lower plate 8 on which said plate rests, thus forming a support for the member 7 and frame 3. The rod 10 may also have a collar 13 thereon extending between the bars 8. Above the upper member 8 rod 10 has a coupling member 14 secured thereto, which member is in the form of a split sleeve having rearwardly projecting flanges connected by the headed and nutted bolts 15. The member 14 is thus clamped securely to the upper end of rod 10. Member 14 has pivoted thereto about a horizontal axis the bracket 16 having right angled flanges extending along the rear end and bottom respectively of the tongue member 17 to which it is connected by the headed and nutted bolts 18 extending through the lower flange of said tongue as well as by the screw 19 extending through the rear flange. The plates 8 extend forward of the rod 10, the upper plate being offset downwardly to extend closer to the lower plate and a double tree is disposed between said plates and pivotally connected thereto by the pin 21.

With the described construction, the horses will be hitched at each side of the tongue 17 and connected to the double tree 20 in the usual manner. The planter will be drawn by the tongue 17 acting through the rod 10 and will be partially supported by the wheel 11. The planter will be steered as usual by the horses moving to one side or the other, this movement being transmitted to rod 10 which in turn turns the wheel 11. Any lateral vibration, however, of the frame 3 of the planter will not be transmitted to the tongue 7 as the frame can pivot about the rod 10. Any vertical vibration of the planter will also not be transmitted to the tongue 10 as the frame can swing about the pivoted connecting members 14 and 16. The tongue can also be moved up and down by the movement of the horses without each time tilting the frame 3 as the tongue will pivot about the pivotal connection to the member 14. At the same time, the front end of the planter is effectively supported by the wheel 11 and a large amount of the weight thus taken from the tongue and horses. The flange 11ᵇ on the wheel 11 results in the planter holding to its course when the main wheels of the same strike a stone or drop into a hole or rut. Without the flange, the wheels and planter would under such circumstances tend to skew. The flange 11ᵇ sinks down into the soil or ground 22 as shown in Fig. 2 and prevents this skewing of the planter and the operation of the planter is thus made much more steady and uniform and the same is pulled with greater ease by the horses. A very flexible and convenient implement is thus provided.

From the above description it will be seen that applicant has provided a very simple and efficient structure of supporting and traction means for a two-wheeled corn planter or a similar implement. The invention can be readily and easily installed on all standard forms of corn planters and this can be very easily done with comparatively small expense. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. The combination with a corn planter having a rigid frame supported on two axially alined wheels and having a member projecting forwardly and centrally therefrom, a rod journaled in said member about a vertical axis and extending downwardly therefrom, said rod being bent horizontally at its lower end to form an axle, a flanged wheel journaled on said axle adapted to support said frame, a coupling member secured to said rod above said first mentioned member and a tongue member pivotally connected to said coupling member to swing about a horizontal axis and means for adjusting the height of said coupling member on said rod.

2. The combination with a farm implement having a rigid frame supported on wheels and a member extending forwardly from said frame, of means pivotally connected to the front portion of said member and swingable about a vertical axis therein, a supporting wheel carried by said means, a tongue, and means vertically adjustable on said first mentioned means for pivotally securing said tongue to said first mentioned means for swinging movement about a horizontal axis.

In testimony whereof I affix my signature.

JAKE M. BROZ.